United States Patent
Isaji et al.

(10) Patent No.: US 6,922,624 B2
(45) Date of Patent: Jul. 26, 2005

(54) VEHICLE BRAKE CONTROL APPARATUS

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/695,784

(22) Filed: Oct. 30, 2003

(65) Prior Publication Data

US 2004/0122578 A1 Jun. 24, 2004

(30) Foreign Application Priority Data

Dec. 10, 2002 (JP) ........................................ 2002-358207

(51) Int. Cl.$^7$ .......................... G06F 19/00; G06F 17/10; G06G 7/78
(52) U.S. Cl. ............................. 701/70; 701/80; 701/91; 701/92; 701/96; 701/97; 701/301; 340/435; 340/436
(58) Field of Search .............................. 701/70, 96, 80, 701/91, 92, 97, 301; 303/150; 340/436, 435

(56) References Cited

U.S. PATENT DOCUMENTS

| | | | | |
|---|---|---|---|---|
| 5,249,851 A | * | 10/1993 | Johnsen ...................... 303/150 |
| 6,157,892 A | | 12/2000 | Hada et al. ................. 701/301 |
| 6,397,140 B2 | * | 5/2002 | Minowa et al. ............... 701/96 |
| 6,507,781 B2 | * | 1/2003 | Maruko et al. ............... 701/70 |
| 6,571,165 B2 | * | 5/2003 | Maruko et al. ............... 701/93 |
| 2001/0029419 A1 | * | 10/2001 | Matsumoto et al. .......... 701/80 |
| 2003/0036840 A1 | * | 2/2003 | Aga ............................ 701/83 |
| 2004/0085197 A1 | * | 5/2004 | Watanabe et al. ........... 340/435 |

FOREIGN PATENT DOCUMENTS

JP 11-348799 12/1999

* cited by examiner

Primary Examiner—Thomas G. Black
Assistant Examiner—Brian J. Broadhead
(74) Attorney, Agent, or Firm—Posz Law Group, PLC

(57) ABSTRACT

It is checked based on entered information as to whether a vehicle should be decelerated or not (S106). When the vehicle should decelerate, an automatic brake operation is carried out with a braking force being set to be smaller by a predetermined ratio than an estimated maximum braking force estimated based on a road surface friction coefficient $\mu$(S110).

15 Claims, 5 Drawing Sheets

VEHICLE BRAKE CONTROL APPARATUS

BACKGROUND OF THE INVENTION

This invention relates to a vehicle brake control apparatus having the capability of automatically decelerating or stopping a vehicle to avoid vehicle collision or reducing vehicle damage.

The Japanese Patent Application Laid-open No. 11-348799(1999), corresponding to the U.S. Pat. No. 6,157,892, has already proposed an automatic vehicle brake control technique for the purpose of avoidance of vehicle collision.

However, the above-described conventional vehicle automatic brake control technique is subjected to the following problems. For example, in a condition that the automatic brake operation is started in response to detection of collision danger and almost all of the grip force of a tire friction circle contributes to a braking force, if a driver tries to avoid the vehicle collision with a steering operation, the tire frictional force will deviate from the friction circle and accordingly the driver will not be able to obtain a desired steering force. As a deceleration operation amount decreases in accordance with the steering operation, attaining the driver's intended steering force is delayed.

SUMMARY OF THE INVENTION

In view of the foregoing problems of the prior art, the present invention has an object to provide a vehicle brake control apparatus capable of carrying out an automatic brake operation in response to detected collision danger, in which a stable vehicle traveling control is realized regardless of change of road surface conditions or presence of driver's steering operation during the automatic brake operation.

In order to accomplish the above and other related objects, the present invention provides a vehicle brake control apparatus including a brake commanding element, a braking element, and a braking force restricting element. The brake commanding element makes a judgment based on input information as to whether a vehicle should decelerate or not and generates a brake command when it is determined that the vehicle should decelerate. The braking element applies brake on the vehicle with a predetermined braking force corresponding to the brake command generated by the brake commanding element. And, the braking force restricting element restricts a maximum value of the braking force to be generated by the braking element in response to the brake command to a value smaller by a predetermined ratio than an estimated maximum braking force being estimated based on information relating to a road surface friction coefficient.

According to the vehicle brake control apparatus of this invention, it becomes possible to realize a stable vehicle brake operation during an automatic brake operation or during a warning brake operation, which is performed to avoid collision danger, regardless of the condition or change of road surface. Furthermore, the vehicle brake control apparatus of this invention can promptly and surely control the behavior of the vehicle in a manner predicted or expected by a driver even in a case that the driver turns or rotates a steering wheel or depresses an accelerator pedal during the automatic brake operation being carried out.

Furthermore, when the driver tries to avoid vehicle collision with a steering operation or with an accelerating operation based on his/her own decision after the brake operation is carried out for decelerating the vehicle, the vehicle can immediately respond to the driver's intended steering operation or accelerating operation because the braking force for the currently performing automatic brake operation is set to an appropriate level within the range of a tire friction circle which represents a frictional force in an arbitrary direction generable by a tire, i.e., to a level lower by a predetermined rate than a physically obtainable maximum frictional force.

According to a preferred embodiment of the present invention, a collision detecting apparatus is provided in the vehicle. For example, the collision detecting apparatus is a sensor capable of measuring the distance to a vehicle traveling ahead or capable of measuring a relative speed between the vehicle traveling ahead and its own vehicle. An image sensor or a radar equipment capable of identifying an obstacle positioned ahead of the vehicle is also usable as the collision detecting apparatus of this invention. The above-described restriction of the braking force is feasible when the brake is applied on the vehicle based on an output of the collision detecting apparatus.

According to the preferred embodiment of the present invention, a means for estimating or determining the road surface friction coefficient is provided. The braking force during the automatic brake operation is restricted, for example, to a level equivalent to a half of or less than the tire friction circle determined based on the road surface friction coefficient. With this arrangement, it becomes possible to secure a sufficient margin of acceleration or steering performance even after the brake is applied on the vehicle. Therefore, it becomes possible to realize an excellent brake operation capable of stably controlling the vehicle behavior. The means for estimating or determining the road surface friction coefficient can use the road surface friction coefficient itself and also can use any other information having correlation to the road surface friction coefficient. In this respect, GPS date information (month, day, hour, etc.), GPS position information, VICS weather information, ABS wheel speed related information, ambient temperature information, driver's input information, or the like can be used as the information relevant to the road surface friction coefficient.

In the preferred embodiment of the present invention, the information relating to the road surface friction coefficient has correlation to the information relating to the estimated maximum braking force. Thus, it is possible to restrict the braking force to be generated by the braking element based on the information relating to the road surface friction coefficient. However, in this case, the braking force should be restricted to be lower than a value obtained by multiplying a predetermined rate with the estimated maximum braking force which is estimated based on the information relating to the road surface friction coefficient.

In a preferred embodiment of the present invention, the brake commanding element commands an automatic brake operation carried out for automatically decelerating the vehicle when it is judged that there is a prospective danger of vehicle collision or there is a necessity of securing safety of the vehicle based on entered collision danger information relating to collision danger of the vehicle relative to a forward obstacle or relevant information for vehicle safety. And, the braking force restricting element sets a maximum value of an automatic braking force, being the braking force to be generated by the braking element during the automatic brake operation, to a value smaller by a predetermined ratio than the estimated maximum braking force.

According to this arrangement, in the automatic brake operation for reducing the collision danger or collision damage, the above-described effects are enjoyed. Especially, in the beginning of such emergent situation, the automatic brake operation is carried out so as to assure vehicle controllability. Thus, in an event that the driver adopts any one of three principal vehicle controls, i.e., accelerating, turning, and braking operations, the vehicle can immediately and accurately respond to the driver's intent. It becomes possible to enhance the effect of reducing the collision damage of the vehicle.

In another preferred embodiment of the present invention, the brake commanding element commands a warning brake operation carried out for decelerating the vehicle as a warning given to a driver when it is judged that there is a prospective danger of vehicle collision or there is a necessity of securing safety of the vehicle based on entered collision danger information relating to collision danger of the vehicle relative to a forward obstacle or relevant information for vehicle safety. And, the braking force restricting element sets a maximum value of a warning braking force, being the braking force to be generated by the braking element during the warning brake operation, to a value smaller by a predetermined ratio than the estimated maximum braking force.

According to this arrangement, in the warning brake operation for reducing the collision danger or collision damage, the above-described effects are enjoyed. Especially, in the beginning of such emergent situation, the warning brake operation is carried out so as to assure vehicle controllability. Thus, in an event that the driver adopts any one of three principal vehicle controls, i.e., accelerating, turning, and braking operations, the vehicle can immediately and accurately respond to the driver's intent. It becomes possible to enhance the effect of reducing the collision damage of the vehicle.

In the preferred embodiment of the present invention, the braking force restricting element sets a maximum value of the automatic braking force or the warning braking force to somewhere in a range corresponding to 5% to 60% of the estimated maximum braking force. With this arrangement, it becomes possible to immediately generate a sufficient steering force or a sufficient acceleration force in response to driver's intent.

In the preferred embodiment of the present invention, the braking force restricting element sets a braking force higher than an inherent braking force corresponding to a manual brake operation amount, within the range of the estimated maximum braking force being estimated based on the road surface friction coefficient or regardless of the estimated maximum braking force, when a manual braking operation is performed during the automatic brake operation or during the warning brake operation.

With this arrangement, when the driver applies manual braking on the vehicle (i.e., depresses a brake pedal based on his/her own decision) during the automatic brake operation or the warning brake operation being carried out, the braking force to be generated by the braking element is increased or boosted up to a level higher than the inherent braking force corresponding to the brake operation amount given by the driver. When the braking force is increased within the range of the estimated maximum braking force being estimated based on the road surface friction coefficient, it becomes possible to realize excellent braking response within the range of the maximum braking force. On the other hand, when the braking force is increased disregarding the estimated maximum braking force being estimated based on the road surface friction coefficient, it becomes possible realize enhanced braking in the case that a maximum braking force generable from an actual road surface is larger than the estimated maximum braking force.

In the preferred embodiment of the present invention, the braking force restricting element increases the braking force within the range of the estimated maximum braking force, when the driver applies none of manual braking, manual steering, and manual accelerating operations when a predetermined time has elapsed after the automatic brake operation or the warning brake operation is started.

With this arrangement, it becomes possible to enhance the effect of decelerating the vehicle during the automatic brake operation or during the warning brake operation without deviating from the range of the estimated maximum braking force in an event that the driver has failed or delayed in effecting the above-described manual operation to be inherently performed.

In the preferred embodiment of the present invention, the braking force restricting element allows the automatic brake operation in which the braking force is maximized when it is judged that the possibility of avoiding vehicle collision by steering is lower than a predetermined rate. With this arrangement, it becomes possible to minimize the collision damage in such serious situation that the steering operation brings no effect in avoiding the vehicle collision.

As another aspect, the present invention provides a method for controlling an automatic vehicle braking apparatus including the steps of judging as to whether a vehicle should decelerate or not, restricting a maximum value of a braking force to be generated by the automatic vehicle braking apparatus to a value smaller by a predetermined ratio than an estimated maximum braking force being estimated based on information relating to a road surface friction coefficient, generating a brake command with reference to the maximum value of the braking force to be generated by the automatic vehicle braking apparatus, when it is determined that the vehicle should decelerate, and actuating the automatic vehicle braking apparatus to apply brake on the vehicle in accordance with the brake command, thereby carrying out an automatic brake operation.

In a preferred control method of the automatic vehicle braking apparatus, the maximum value of the braking force to be generated by the automatic vehicle braking apparatus is set to somewhere in a range corresponding to 5% to 60% of the estimated maximum braking force. The braking force to be generated by the automatic vehicle braking apparatus is set to be higher than an inherent braking force corresponding to a manual brake operation amount when a manual braking operation is performed during the automatic brake operation.

In another preferred control method of the automatic vehicle braking apparatus, the braking force to be generated by the automatic vehicle braking apparatus is increased within the range of the estimated maximum braking force, when a driver applies none of manual braking, manual steering, and manual accelerating operations when a predetermined time has elapsed after the automatic brake operation or the warning brake operation is started.

In another preferred control method of the automatic vehicle braking apparatus, the automatic brake operation is carried out with a maximized braking force when it is judged that the possibility of avoiding vehicle collision by steering is lower than a predetermined rate.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

Figure 1:
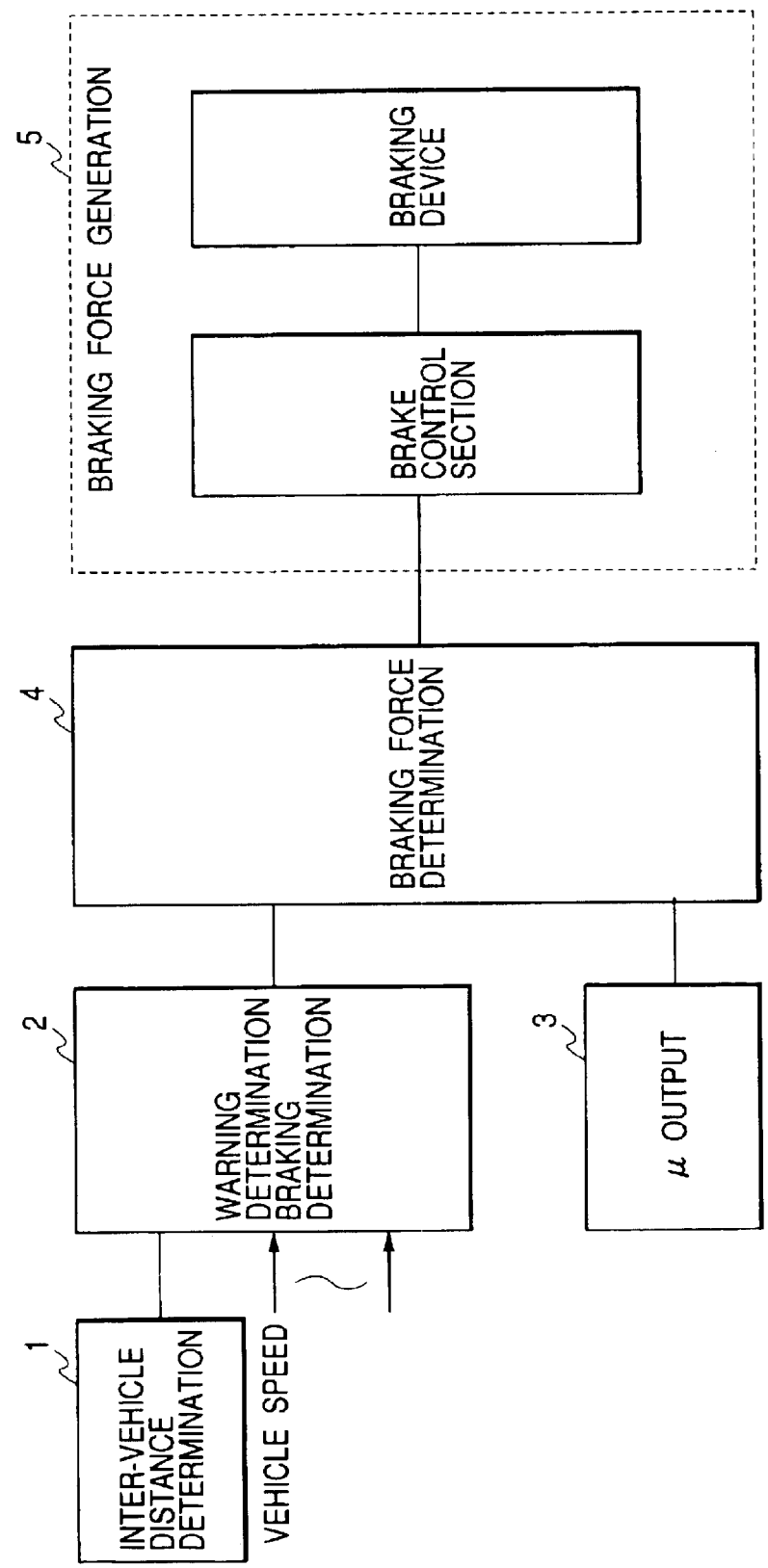
FIG. 1 is a block diagram showing a vehicle brake control apparatus in accordance with a preferred embodiment of the present invention.

FIG. 1 is a block diagram showing an automatic vehicle braking apparatus in accordance with a preferred embodiment of the present invention.

The automatic vehicle braking apparatus includes an inter-vehicle distance determining element 1, an automatic brake/warning determining element 2, a road surface friction coefficient determining element 3, a braking force determining element 4, and a braking apparatus 5 generating a braking force.

The inter-vehicle distance determining element 1 is an apparatus for determining a distance to a forward obstacle or to a vehicle traveling ahead (hereinafter, collectively referred to as "inter-vehicle distance"). For example, the inter-vehicle distance determining element 1 is an image processing type inter-vehicle distance detecting apparatus consisting of a pair of TV (or CCD) cameras for picking up an image spreading ahead of the vehicle and a processing apparatus for processing image signals generated from the cameras and calculating a distance to the forward obstacle or to the vehicle traveling ahead. Alternatively, the inter-vehicle distance determining element 1 is a radar type inter-vehicle distance detecting apparatus including a radar apparatus for measuring a distance to the forward obstacle or to the vehicle traveling ahead. This kind of inter-vehicle distance calculation technique is conventionally well known and accordingly will not be explained in the following description.

The automatic brake/warning determining element 2 is a computing apparatus for calculating the probability of vehicle collision based on the inter-vehicle distance, a vehicle speed and the like entered from the inter-vehicle distance determining element 1. The computing apparatus commands a warning brake operation in a case that the vehicle collision probability is within a predetermined range not exceeding a critical level of causing danger of vehicle collision even if the vehicle maintains the present traveling conditions. Furthermore, the computing apparatus commands an automatic brake operation in a case that the vehicle collision probability exceeds the critical level of causing danger of vehicle collision if the vehicle maintains the present traveling conditions.

This king of technique for calculating the possibility of causing danger of vehicle collision and performing the automatic brake operation or issuing the warning is conventionally well known and therefore will not be explained in the following description.

The road surface friction coefficient determining element 3 is an apparatus for outputting a road surface friction coefficient or relevant information. The information generated from the road surface friction coefficient determining element 3, for example, includes weather information and road position information entered from an external device, as well as weather condition related information detected by a sensor equipped in the vehicle and road surface condition related information manually entered by a driver, and also the information resulting from actual repetitive braking operations. Preferably, a predetermined braking operation is performed periodically to obtain a degree of wheel deceleration or a reduction rate of vehicle speed. The road surface friction coefficient determining element 3 includes a map storing beforehand the relationship between the road surface friction coefficient and the wheel deceleration degree or the vehicle speed reduction rate. The road surface friction coefficient determining element 3 determines a present road surface friction coefficient based on the detected data of the wheel deceleration degree or the vehicle speed reduction rate with reference to the map.

The braking force determining element 4 is an element having the capability of performing various functions relating to characteristic features of this embodiment. When the automatic brake/warning determining element 2 determines carrying out the automatic braking operation or issuing the warning, the braking force determining element 4 estimates an estimated maximum braking force based on the road surface friction coefficient or the related data entered from the road surface friction coefficient determining element 3. The braking force determining element 4 calculates a maximum value of the braking force generable for the automatic brake operation or the warning brake operation by multiplying a predetermined rate with the estimated maximum braking force. Then, the braking force determining element 4 determines a target braking force for the automatic braking operation or the warning brake operation which is set to a predetermined value within a range not exceeding the above calculated maximum value of the braking force generable for the automatic brake operation or the warning brake operation. The automatic brake/warning determining element 2 will be explained later in more detail.

The braking apparatus 5 is a braking apparatus for generating the target braking force determined by the braking force determining element 4. The braking apparatus consists of a braking device and a brake control section giving a brake operation command to the braking device. The brake control section determines the brake operation command in accordance with the target braking force determined by the braking force determining element 4. This kind of braking apparatus is conventionally well known.

The operation of the above-described automatic vehicle braking apparatus in accordance with this embodiment will be explained hereinafter with reference to a flowchart shown in FIG. 2.

First, in step S100 (corresponding to the operation of the road surface friction coefficient determining element 3), a road surface friction coefficient $\mu$ is estimated. In this routine, a predetermined braking force is intentionally generated and the road surface friction coefficient $\mu$ is determined according to the above-described method. However, it is possible to estimate the road surface friction coefficient $\mu$ based on the information entered from an external device.

Next, in step S102 (corresponding to the operation of the inter-vehicle distance determining element 1), the distance to the forward obstacle or to the vehicle traveling ahead (i.e., the inter-vehicle distance) is determined.

Next, in step S104, a reduction rate of the inter-vehicle distance is obtained, and a time remaining for preventing the vehicle from colliding with the forward obstacle or the vehicle traveling ahead is calculated based on the obtained reduction rate of the inter-vehicle distance and also based on the inter-vehicle distance. Then, in step S106, the time remaining for avoiding the vehicle collision is compared with an estimated time required for the vehicle to stop or sufficiently decelerate when the brake is applied. It is then checked as to whether there is any possibility that the vehicle will collide with the forward obstacle or the vehicle traveling ahead, i.e., whether or not the possibility of collision danger is equal to or larger than a predetermined level. When there is a higher possibility of vehicle collision, or when the collision danger rate is high (i.e., YES in step S106), the control flow proceeds to step S108. Otherwise, the control flow returns to step S100.

In the step S108, it is then checked as to whether any manual braking operation is currently carried out by a driver, based on an input signal entered from a switch means (not shown) which detects the application of manual braking. If no manual braking operation is currently performed (NO in step S108), the control flow proceeds to step S110. In the step S110, a target braking force is obtained based on the estimated road surface friction coefficient $\mu$. In this case, the target braking force is set to anywhere in the range equivalent from 5% to 60% of the above-described estimated maximum braking force determined by the braking force determining element 4. The target braking force being thus obtained is transmitted to the braking apparatus 5, thereby performing the automatic brake operation.

Next, the control flow proceeds to step S112 to check whether or not the vehicle is stopped or sufficiently decelerated. When the vehicle is not stopped or sufficiently decelerated yet (i.e., NO in step S112), the control flow returns to the step S1100. On the other hand, when the vehicle is already stopped or sufficiently decelerated (i.e., YES in step S112), the automatic brake operation is terminated in step S114. Subsequently, this routine is finished.

Meanwhile, when any manual braking operation by the driver is currently performed (i.e., YES in step S108), the control flow proceeds to step S116. In the step S116, a braking force value corresponding to a present manual braking operation amount (e.g., a depression amount of a brake pedal) is multiplied by a predetermined rate to substantially increase or boost the target braking force to be commanded to the braking apparatus 5. In this case, the increased or boosted target braking force is restricted within a predetermined range of the braking force being set within the above-described estimated maximum braking force. Alternatively, the increased or boosted target braking force can be univocally set to a maximum value (i.e., can be equalized to the estimated maximum braking force).

Next, the control flow proceeds to step S118, it is again checked as to whether the manual braking operation is currently curried out by the driver or not. When the manual braking operation is still performed (i.e., YES in step S118), the control flow returns to step S116. On the other hand, when the manual braking operation is not performed (i.e., NO in step S118), the control flow returns to step S100.

In the above-described routine, the step S100 for estimating the road surface friction coefficient $\mu$ can be executed periodically as interrupt routine. Alternatively, it is possible to use a memory value entered from an external device.

In this embodiment, the braking apparatus 5 serves as a braking element of the present invention. The automatic brake/warning determining element 2 and the braking force determining element 4 cooperatively serve as a brake commanding element of the present invention. The steps S106 to S118 of FIG. 2 represent the operations realized by the automatic brake/warning determining element 2 and the braking force determining element 4. The braking force determining element 4 serves as a braking force restricting element of the present invention. The steps S110 and S116 represent the operation of the braking force restricting element. The road surface friction coefficient determining element 3, whose operation is represented by the step S102, corresponds to a means for estimating or determining the road surface friction coefficient.

Namely, this embodiment obtains the target braking force for the automatic brake operation which is set to somewhere in the range corresponding to 5% to 60% of the estimated maximum braking force being determined based on the road surface friction coefficient $\mu$, and carries out the automatic brake operation based on the obtained target braking force in response to detection of collision danger. The effects brought by this embodiment will be hereinafter explained with reference to the tire friction circle shown in each of FIGS. 3 to 5.

The friction circle concept is important today as a diagnostic tool. This tool can be used with any type of car (or truck) to graphically represent traction capacity or help identify why a car has lost traction.

Figure 3:
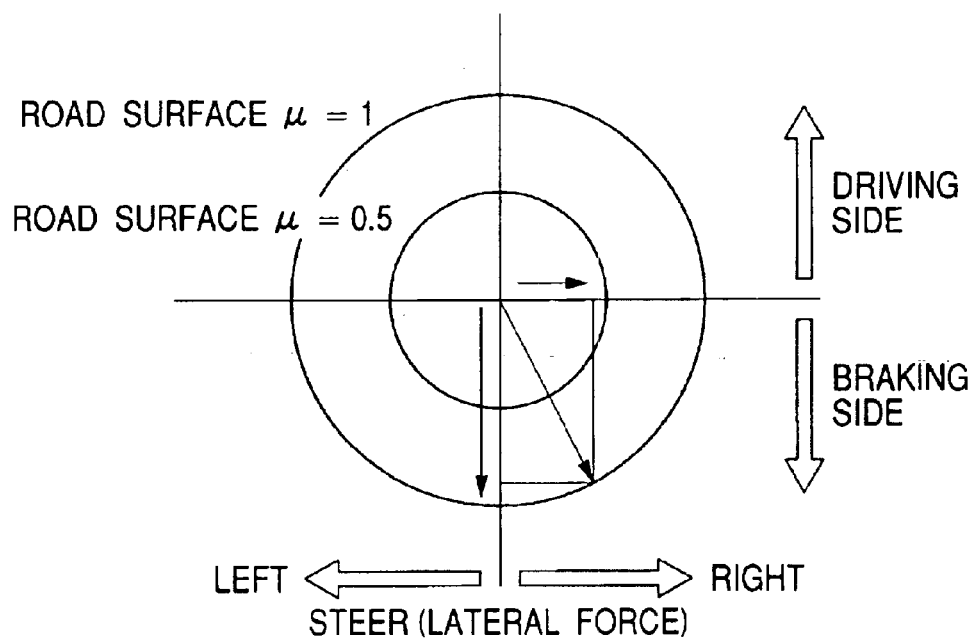
FIG. 3 is a schematic view explaining the relationship between a friction circle and road surface friction coefficient $\mu$.
Figure 4:
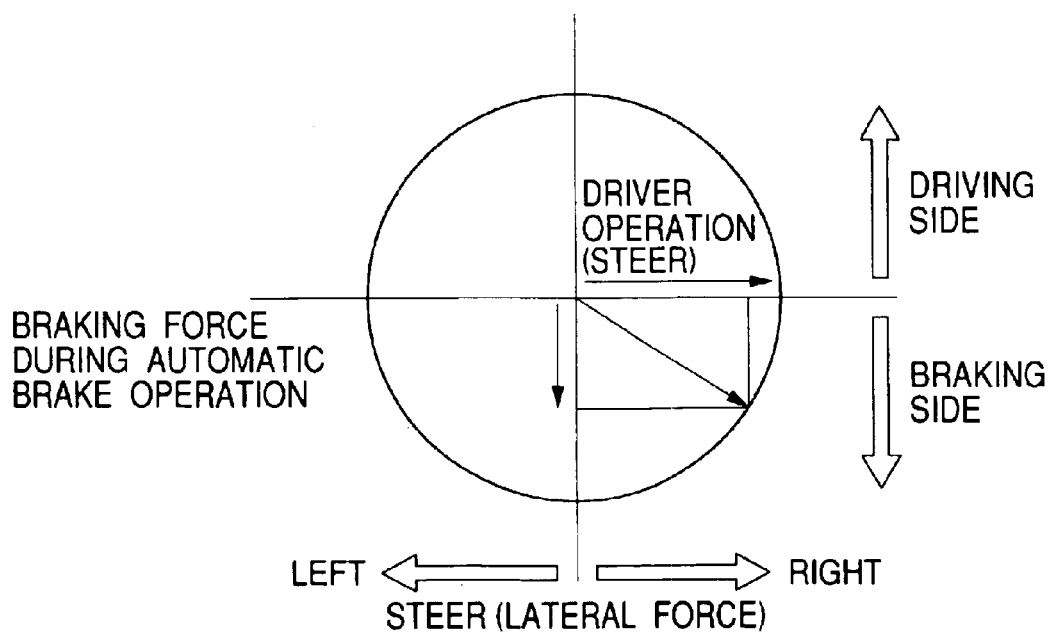
FIG. 4 is a schematic view explaining the relationship between the friction circle and applied steering operation.

The tire friction circle represents a maximum value of a tire frictional force in all directions, i.e., estimated maximum braking force. A radius of the tire friction circle, i.e., the maximum value of the tire frictional force, changes in substantially proportion to the road surface friction coefficient $\mu$ as shown in FIG. 3. Accordingly, when a driver intends to generate a steering force with a steering operation during the automatic brake operation in this embodiment, the tire frictional force can be represented with a composite vector of the braking force caused by the automatic brake operation and the steering force by the steering operation. If the braking force caused by the automatic brake operation is close to or substantially equal to the maximum value of the tire frictional force (i.e., estimated maximum braking force) determined by a momentary road surface friction coefficient $\mu$, the tire frictional force to be generated will exceed the tire friction circle even by adding a small steering force. In other words, a desired steering force cannot be obtained. On the other hand, as shown in FIG. 4, this embodiment restricts the target braking force to be generated during the automatic brake operation to a predetermined value within the range corresponding to 5% to 60% of the estimated maximum braking force being determined based on the momentary road surface friction coefficient $\mu$. Thus, even when the driver tries to avoid an obstacle with the steering operation during the automatic brake operation, a driver's intended steering force can be immediately obtained unless it exceeds an allowable limit of the tire friction circle.

Figure 5:
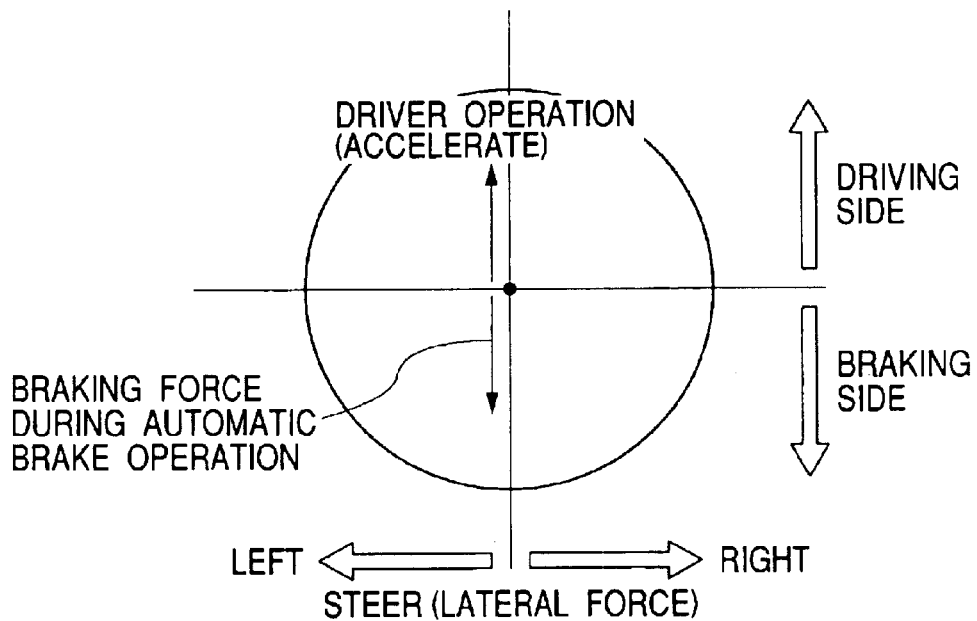
FIG. 5 is a schematic view showing the relationship between the friction circle and applied accelerating operation.

Even in a case that the driver accelerates the vehicle during the automatic brake operation, the braking force generated by the automatic brake operation is relatively small and accordingly the vehicle can smoothly or quickly shift into the accelerating condition from the braking condition in response to driver's operation as shown in FIG. 5.

Modified Embodiment 1

According to the above-described embodiment, when the manual braking operation is detected in the step S108, the control flow proceeds to the step S116 to increase or boost the target braking force in such a manner that a braking force value corresponding to the present manual braking operation amount is multiplied with a predetermined rate. This multiplying or boosting brake operation is restricted to somewhere in the braking force range being set in the range of the above-described estimated maximum braking force. It is however possible to increase or boost the brake pedal depression amount with a booster in response to detection of the manual braking operation, thereby generating an increased or boosted braking force which is equivalent to predetermined times the braking force to be inherently generated in response to a driver's brake operation amount during the manual braking operation while neglecting the above-described estimated maximum braking force. With this operation, it becomes possible to realize an excellent brake operation for the vehicle when a true maximum braking force of the road surface actually exceeds the estimated maximum braking force.

Modified Embodiment 2

According to the above-described embodiment, the target braking force during the automatic brake operation is restricted to a value approximately equal to or less than a half of the generable estimated maximum braking force. The brake control technique of this invention can be used for generating a braking force as a warning given to the driver when it is judged that the possibility of collision danger is high. The braking operation for warning, i.e., the warning brake operation, is carried out periodically predetermined times.

Hereinafter, an explanation is given based on the flowchart shown in FIG. 2. According to this modified embodiment, the braking force for warning (i.e., the warning braking force) is generated at the step S110. The warning braking force is set to a value in a range corresponding to 5% to 60% of the estimated maximum braking force determined based on an estimated road surface friction coefficient $\mu$. The warning brake operation is carried out periodically predetermined times with the thus obtained warning braking force, and with a predetermined duty ratio.

With this operation, during the warning brake operation, it becomes possible to quickly obtain a driver's intended steering force when the driver intends to avoid vehicle collision with a steering operation.

Modified Embodiment 3

In a preferred embodiment of the present invention, the braking force is for example increased to a maximum value within the range of the estimated maximum braking force, when a driver applies none of manual braking, manual steering, and manual accelerating operations within a predetermined time after the automatic brake operation or the warning brake operation is started.

Figure 6:
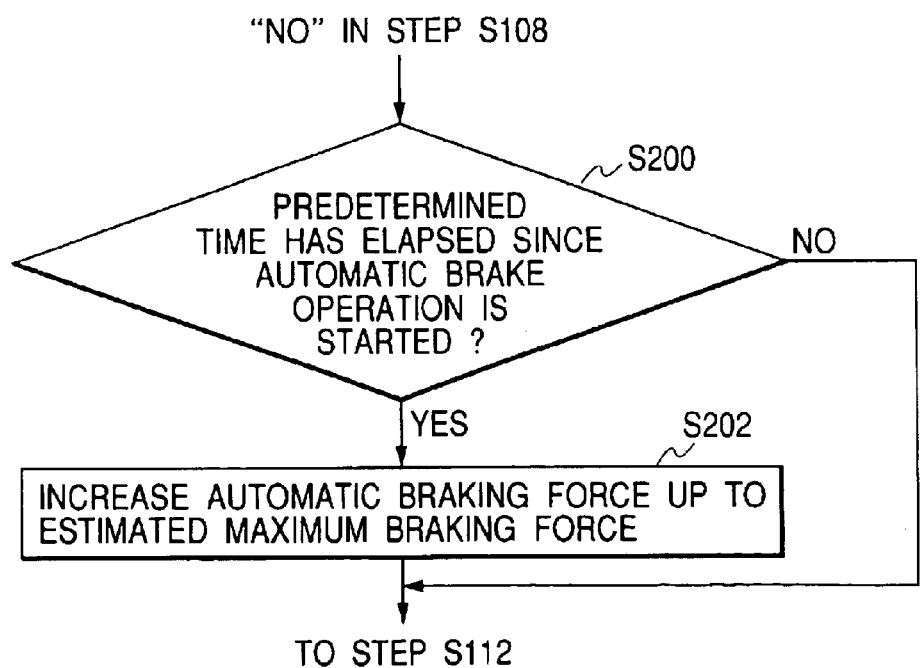
FIG. 6 is a flowchart showing a modified control operation of the vehicle brake control apparatus shown in FIG. 1 in accordance with another preferred embodiment of the present invention.

This processing will be explained hereinafter with reference to a flowchart shown in FIG. 6.

When it is judged that no manual operation (i.e., no manual braking, no manual steering, and no manual accelerating operations) is performed (i.e., NO in step S108 in FIG. 2), the control flow proceeds to step S200. In the step S200, it is checked as to whether a predetermined time has elapsed or not after the automatic brake operation of step S110 is started. When the predetermined time has not elapsed yet after the automatic brake operation is started (i.e., NO in step S200), the control flow skips the following step S202 and proceeds to the step S112. On the other hand, when the predetermined time has elapsed after the automatic brake operation is started (i.e., YES in step S200), the control flow proceeds to the step S202. In the step S202, the automatic braking force is set to be equal to the estimated maximum braking force determined based on the road surface friction coefficient $\mu$. The automatic braking force being thus determined is transmitted or commanded to the braking apparatus 5. Then, the control flow proceeds to the step S112.

According to this brake control, it becomes possible to efficiently decelerate the vehicle with a realizable maximum deceleration in an event that the driver has failed or delayed in effecting the above-described manual operation to be inherently performed.

Modified Embodiment 4

In another preferred embodiment, the automatic brake operation for maximizing the braking force is carried out when it is judged that the possibility of avoiding vehicle collision by steering is lower than a predetermined rate. With this operation, it becomes possible to minimize the collision damage in such serious situation that the steering operation brings no effect in avoiding the vehicle collision.

Figure 7:
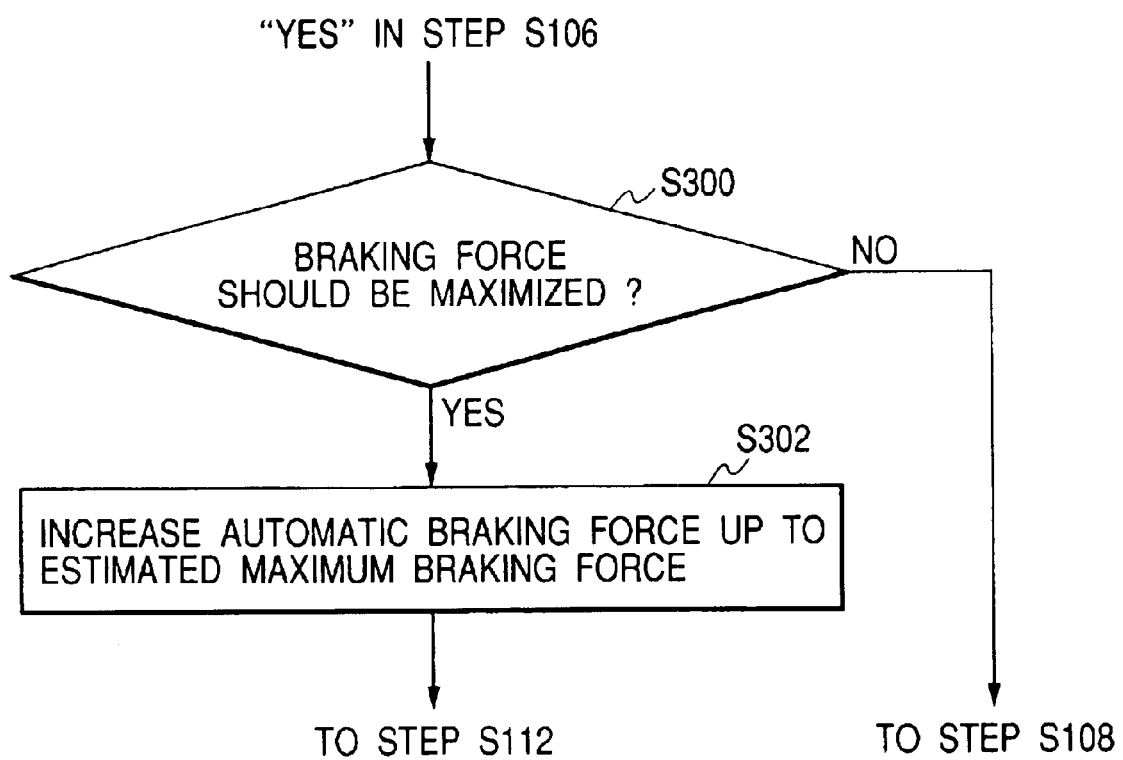
FIG. 7 is a flowchart showing another modified control operation of the vehicle brake control apparatus shown in FIG. 1 in accordance with another preferred embodiment of the present invention.

This processing will be explained hereinafter with reference to a flowchart shown in FIG. 7.

Figure 2:
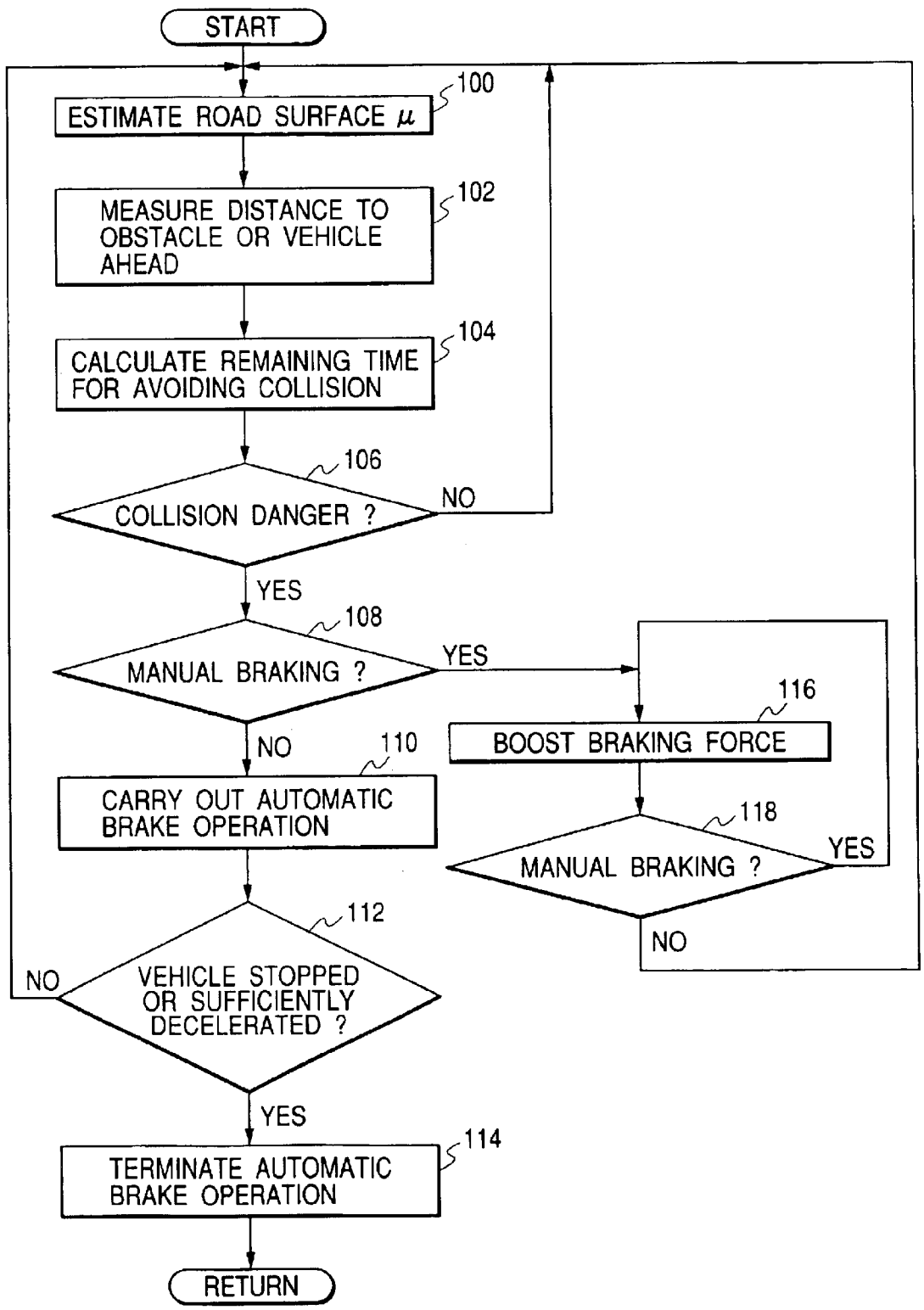
FIG. 2 is a flowchart showing a control operation of the vehicle brake control apparatus shown in FIG. 1.

When it is judged in the step S106 of FIG. 2 that the possibility of collision danger is high (i.e., YES in step S106), the control flow proceeds to step S300. In step S300, it is checked as to whether the vehicle collision is unavoidable with any possible manual operation (i.e., manual braking, manual steering, and manual accelerating operations, or the like). In other words, it is checked in step S300 as to whether the braking force should be maximized or not. When it is judged that the vehicle collision is unavoidable with any manual operation (i.e., YES in step S300), the control flow proceeds to step S302. In the step S302, the automatic braking force is set to be equal to the estimated maximum braking force determined based on the latest road surface friction coefficient $\mu$. The automatic braking force being thus determined is transmitted or commanded to the braking apparatus 5. Then, the control flow proceeds to the step S112. On the other hand, when it is judged that the vehicle collision is avoidable with any manual operation (i.e., NO in step S300), the control flow skips the step S302 and proceeds to the step S108.

As apparent from the foregoing description, the present invention provides a vehicle brake control apparatus including the brake commanding element for making a judgment based on input information as to whether the vehicle should decelerate or not and for generating a brake command when it is determined that the vehicle should decelerate, and the braking element for applying brake on the vehicle with a predetermined braking force corresponding to the brake command generated by the brake commanding element. And, the braking force restricting element is provided for restricting a maximum value of the braking force to be generated by the braking element in response to the brake command to a value smaller by a predetermined ratio than the estimated maximum braking force being estimated based on information relating to the road surface friction coefficient.

Preferably, the brake commanding element commands the automatic brake operation carried out for automatically decelerating the vehicle when it is judged that there is a prospective danger of vehicle collision or there is a necessity of securing safety of the vehicle based on entered collision danger information relating to collision danger of the vehicle relative to a forward obstacle or relevant information for vehicle safety. In this case, the braking force restricting element sets a maximum value of an automatic braking force, i.e., the braking force to be generated by the braking element during the automatic brake operation, to a value smaller by a predetermined ratio than the estimated maximum braking force.

Preferably, the brake commanding element commands the warning brake operation carried out for decelerating the vehicle as a warning given to the driver when it is judged that there is a prospective danger of vehicle collision or there is a necessity of securing safety of the vehicle based on entered collision danger information relating to collision danger of the vehicle relative to a forward obstacle or relevant information for vehicle safety. In this case, the braking force restricting element sets a maximum value of a warning braking force, i.e., the braking force to be generated by the braking element during the warning brake operation, to a value smaller by a predetermined ratio than the estimated maximum braking force.

Preferably, the braking force restricting element sets a maximum value of the automatic braking force or the warning braking force to somewhere in a range corresponding to 5% to 60% of the estimated maximum braking force.

Preferably, the braking force restricting element sets a braking force higher than an inherent braking force corresponding to a manual brake operation amount, within the range of the estimated maximum braking force being estimated based on road surface friction coefficient or regardless of the estimated maximum braking force, when a manual braking operation is carried out during the automatic brake operation or during the warning brake operation.

Preferably, the braking force restricting element increases the braking force within the range of the estimated maximum braking force, when a driver applies none of manual braking, manual steering, and manual accelerating operations when a predetermined time has elapsed after the automatic brake operation or the warning brake operation is started.

Preferably, the braking force restricting element allows the automatic brake operation in which the braking force is maximized when it is judged that the possibility of avoiding vehicle collision by steering is lower than a predetermined rate.

Furthermore, the present invention provides a method for controlling an automatic vehicle braking apparatus including the steps of judging as to whether a vehicle should decelerate or not, restricting a maximum value of a braking force to be generated by the automatic vehicle braking apparatus to a value smaller by a predetermined ratio than an estimated maximum braking force being estimated based on information relating to a road surface friction coefficient, generating a brake command with reference to the maximum value of the braking force to be generated by the automatic vehicle braking apparatus, when it is determined that the vehicle should decelerate, and actuating the automatic vehicle braking apparatus to apply brake on the vehicle in accordance with the brake command, thereby carrying out an automatic brake operation.

Preferably, the maximum value of the braking force to be generated by the automatic vehicle braking apparatus is set to somewhere in a range corresponding to 5% to 60% of the estimated maximum braking force.

Preferably, the braking force to be generated by the automatic vehicle braking apparatus is set to be higher than an inherent braking force corresponding to a manual brake operation amount when a manual braking operation is performed during the automatic brake operation.

Preferably, the braking force to be generated by the automatic vehicle braking apparatus is increased within the range of the estimated maximum braking force, when a driver applies none of manual braking, manual steering, and manual accelerating operations when a predetermined time has elapsed after the automatic brake operation or the warning brake operation is started.

Preferably, the automatic brake operation is carried out with a maximized braking force when it is judged that the possibility of avoiding vehicle collision by steering is lower than a predetermined rate.

What is claimed is:

1. A vehicle brake control apparatus comprising:
   a brake commanding element for making a judgment based on input information as to whether a vehicle should decelerate or not and for generating a brake command when it is determined that the vehicle should decelerate;
   a braking element for applying brake on the vehicle with a predetermined braking force corresponding to said brake command generated by said brake commanding element; and
   a braking force restricting element for restricting a maximum value of said braking force to be generated by said braking element in response to said brake command to a value smaller by a predetermined ratio than an estimated maximum braking force being estimated based on information relating to a road surface friction coefficient,
   wherein
   said brake commanding element commands an automatic brake operation carried out for automatically decelerating the vehicle when it is judged that there is a prospective danger of vehicle collision or there is a necessity of securing safety of the vehicle based on entered collision danger information relating to collision danger of the vehicle relative to a forward obstacle or relevant information for vehicle safety,
   said braking force restricting element sets a maximum value of an automatic braking force, being said braking force to be generated by said braking element during said automatic brake operation, to a value smaller by a predetermined ratio than said estimated maximum braking force, and
   said braking force restricting element increases said braking force within a range of said estimated maximum braking force, when a driver applies none of manual braking, manual steering, and manual accelerating operations when a predetermined time has elapsed after said automatic brake operation is started.

2. The vehicle brake control apparatus in accordance with claim 1, wherein said braking force restricting element sets the maxium value of said automatic braking force to somewhere in a range corresponding 5% to 60% of said estimated maximum braking force.

3. The vehicle brake control apparatus in accordance with claim 1, wherein said braking force restricting element sets a braking force higher than an inherent braking force corresponding to a manual brake operation amount, within the range of said estimated maximum braking force being estimated based on said road surface friction coefficient, when a manual braking operation is carried out during said automatic brake operation.

4. The vehicle brake control apparatus in accordance with claim 1, wherein said braking force restricting element sets a braking force higher than an inherent braking force corresponding to a manual brake operation amount, regardless of said estimated maximum braking force, when a manual braking operation is carried out during said automatic brake operation.

5. A vehicle brake control apparatus comprising:
  a brake commanding element for making a judgment based on input information as to whether a vehicle should decelerate or not and for generating a brake command when it is determined that the vehicle should decelerate;
  a braking element for applying brake on the vehicle with a predetermined braking force corresponding to said brake command generated by said brake commanding element; and
  a braking force restricting element for restricting a maximum value of said braking force to be generated by said braking element in response to said brake command to a value smaller by a predetermined ratio than an estimated maximum braking force being estimated based on information relating to a road surface friction coefficient,
  wherein said braking force restricting element allows an automatic brake operation in which the braking force is maximized when it is judged that the possibility of avoiding vehicle collision by steering is lower than a predetermined rate.

6. A vehicle brake control apparatus comprising:
  a brake commanding element for making a judgment based on input information as to whether a vehicle should decelerate or not and for generating a brake command when it is determined that the vehicle should decelerate;
  a braking element for applying brake on the vehicle with a predetermined braking force corresponding to said brake command generated by said brake commanding element; and
  a braking force restricting element for restricting a maximum value of said braking force to be generated by said braking element in response to said brake command to a value smaller by a predetermined ratio than an estimated maximum braking force being estimated based on information relating to a road surface friction coefficient,
  wherein
  said brake commanding element commands a warning brake operation carried out for decelerating the vehicle as a warning given to a driver when it is judged that there is a prospective danger of vehicle collision or there is a necessity of securing safety of the vehicle based on entered collision danger information relating to collision danger of the vehicle relative to a forward obstacle or relevant information for vehicle safety, and
  said braking force restricting element sets a maximum value of a warning braking force, being said braking force to be generated by said braking element during said warning brake operation, to a value smaller by a predetermined ratio than said estimated maximum braking force said braking force restricting element increases said braking force within a range of said estimated maximum braking force, when a driver applies none of manual braking, manual steering, and manual accelerating operations when a predetermined time has elapsed after said warning brake operation is started.

7. The vehicle brake control apparatus in accordance with claim 6, wherein said braking force restricting element sets the maximum value of said warning braking force to somewhere in a range corresponding to 5% to 60% of said estimated maximum braking force.

8. The vehicle brake control apparatus in accordance with claim 6, wherein said braking force restricting element sets a braking force higher than an inherent braking force corresponding to a manual brake operation amount, within a range of said estimated maximum braking force being estimated based on said road surface friction coefficient, when a manual braking operation is carried out during said warning brake operation.

9. The vehicle brake control apparatus in accordance with claim 6, wherein said braking force restricting element sets a braking force higher than an inherent braking force corresponding to a manual brake operation amount, regardless of said estimated maximum braking force, when a manual braking operation is carried out during said warning brake operation.

10. A method for controlling an automatic vehicle braking apparatus comprising the steps of:
  judging as to whether a vehicle should decelerate or not;
  restricting a maximum value of a braking force to be generated by said automatic vehicle braking apparatus to a value smaller by a predetermined ratio than an estimated maximum braking force being estimated based on information relating to a road surface friction coefficient;
  generating a brake command with reference to said maximum value of the braking force to be generated by said automatic vehicle braking apparatus, when it is determined that the vehicle should decelerate;
  actuating said automatic vehicle braking apparatus to apply brake on the vehicle in accordance with said brake command, thereby carrying out an automatic brake operation; and
  increasing the braking force to be generated by said automatic vehicle braking apparatus within a range of said estimated maximum braking force, when a driver applies none of manual braking, manual steering, and manual accelerating operations when a predetermined time has elapsed after said automatic brake operation or said warning brake operation is started.

11. The method for controlling an automatic vehicle braking apparatus in accordance with claim 10, wherein the maximum value of the braking force to be generated by said automatic vehicle braking apparatus is set to somewhere in a range corresponding to 5% to 60% of said estimated maximum braking force.

12. The method for controlling an automatic vehicle braking apparatus in accordance with claim 10, wherein the braking force to be generated by said automatic vehicle braking apparatus is set to be higher than an inherent braking force corresponding to a manual brake operation amount when a manual braking operation is performed during said automatic brake operation.

13. A method for controlling an automatic vehicle braking apparatus comprising the steps of:

judging as to whether a vehicle should decelerate or not;

restricting a maximum value of a braking force to be generated by said automatic vehicle braking apparatus to a value smaller by a predetermined ratio than an estimated maximum braking force being estimated based on information relating to a road surface friction coefficient;

generating a brake command with reference to said maximum value of the braking force to be generated by said automatic vehicle braking apparatus, when it is determined that the vehicle should decelerate;

actuating said automatic vehicle braking apparatus to apply brake on the vehicle in accordance with said brake command; and carrying out an automatic brake operation with a maximized braking force when it is judged that the possibility of avoiding vehicle collision by steering is lower than a predetermined rate.

14. The method for controlling an automatic vehicle braking apparatus in accordance with claim 13, wherein the maximum value of the braking force to be generated by said automatic vehicle braking apparatus is set to somewhere in a range corresponding to 5% to 60% of said estimated maximum braking force.

15. The method for controlling an automatic vehicle braking apparatus in accordance with claim 13, wherein the braking force to be generated by said automatic vehicle braking apparatus is set to be higher than an inherent braking force corresponding to a manual brake operation amount when a manual braking operation is performed during said automatic brake operation.

* * * * *